United States Patent [19]

Robbins

[11] Patent Number: 4,743,484

[45] Date of Patent: May 10, 1988

[54] LAMINATED VENEER LUMBER (LVL)

[76] Inventor: Earl H. Robbins, P.O. Box 668, Eugene, Oreg. 97440

[21] Appl. No.: 826,263

[22] Filed: Feb. 5, 1986

Related U.S. Application Data

[63] Continuation-in-part of Ser. No. 685,205, Dec. 24, 1984, Pat. No. 4,569,873, which is a continuation of Ser. No. 526,803, Oct. 21, 1983, abandoned, which is a continuation of Ser. No. 470,336, Feb. 28, 1983, abandoned, which is a continuation of Ser. No. 267,057, May 26, 1981, abandoned.

[51] Int. Cl.$^4$ .............................................. B32B 5/12
[52] U.S. Cl. .................................. 428/106; 428/114; 428/529
[58] Field of Search .................. 428/106, 114, 529

[56] References Cited

U.S. PATENT DOCUMENTS

| | | | |
|---|---|---|---|
| 1,387,011 | 8/1921 | Ratcliff | 428/247 |
| 2,356,625 | 8/1944 | Schumann | 428/106 |
| 2,744,044 | 5/1956 | Toulmin, Jr. | 428/297 |
| 3,616,128 | 10/1971 | Pacourek | 428/106 |
| 3,715,257 | 2/1973 | Dunaway et al. | 156/299 |
| 4,086,382 | 4/1978 | Hites | 428/168 |
| 4,204,421 | 5/1980 | Rogers | 428/106 |
| 4,364,984 | 12/1982 | Wentworth | 428/106 |

OTHER PUBLICATIONS

Bulletin, Parallam Division, "Parallam", ©1985 Bulletin, Raute News.

Primary Examiner—John E. Kittle
Assistant Examiner—James J. Seidleck
Attorney, Agent, or Firm—Stevens, Davis, Miller & Mosher

[57] ABSTRACT

A dimensionally stable composite wood panel having wood veneer sheets with their grains disposed in the same direction, and a core of adhesively-bonded biomass particles is improved by including a third wood veneer sheet having its grain substantially perpendicular to the grains of the surface veneer sheets. Additional veneer sheets may lie intermediate the surface sheets and the intermediate sheet, with its grain structure oriented parallel to the surface sheets. The panel produced may be ripped or sawed to form laminated veneer lumber of such dimensions that it may be substituted for structural lumber. The laminated veneer lumber of the present invention has improved dimensional stability and may be nailed without splitting or cracking. A process of manufacturing continuous or indefinite lengths of the composite wood panel is disclosed.

9 Claims, 1 Drawing Sheet

LAMINATED VENEER LUMBER (LVL)

RELATED APPLICATIONS

This application is a continuation-in-part of Ser. No. 685,205 filed Dec. 24, 1984, now U.S. Pat. No. 4,569,873 issued Feb. 11, 1986, which in turn was a continuation of Ser. No. 526,803 filed Oct. 21, 1983, now abandoned, which in turn was a continuation of Ser. No. 470,336 filed Feb. 28, 1983, now abandoned, which in turn was a continuation of Ser. No. 267,057 filed May 26, 1981, now abandoned. The disclosure of each of these applications is herein incorporated by reference.

BACKGROUND OF THE INVENTION

This invention relates generally to wood panels of reduced cost, utilizing waste products which have improved dimensional stability and, more particularly, to composite laminated panels having wood veneer surfaces which may be ripped or sawed along the grain to produce structural lumber. These structural panels and laminated veneer lumber (LVL) have utilities as components of furniture, replacement for lumber in building construction, and are suitable for use as substitutes for conventional lumber or plywood.

It has been previously proposed to manufacture plywood having a plurality of adhesively-bonded wood veneer lamina for use in the construction of buildings. It has also been proposed to make composite wood panels having surface wood veneer sheets, and a core of lignocellulose or the like particles adhesively bonded together to form a mat, which is disposed as a core between the veneer sheets and adhesively bonded thereto. One of the problems inherent in prior art panels is that lateral expansion of the panel across the grain as the panel absorbs moisture, which causes warping and buckling of the panel. The dimensions of the lumber ripped from these panels do not satisfy the requirements of lumber, and the expansion, warping and buckling of the panel also exists in the structural lumber ripped from said panel, and further detracts from its usefulness as a substitute for structural lumber.

It has also been proposed to make laminated veneer lumber directly by gluing wood veneers together with the grain of all plies running parallel to each other. This material is produced in panels and ripped along the grain to produce structural lumber.

Another proposal forms wood strands, blended with resins, into a mat, with the strands oriented in a parallel direction. The mat, pressed to produce an oriented strandboard or flakeboard, is transferred to a lay-up station. Depending on the end use, the strandboard is ripped to the desired width and then laminated with veneers on the edges to produce a stud, joist or other structural product. However, none of these prior art products provided dimensional stability coupled with the strength required as a substitute for structural lumber.

There is therefore a continuing need for the production of structural panels and lumber which may be manufactured at relatively low cost, and avoids disadvantages of dimensional instability of the prior art laminated panels. Additionally, there is a need for laminated veneer lumber which may be substituted for conventional structural lumber, including the acceptance of fasteners, such as nails, staples, screws and the like, without splitting or delaminating upon installation of the fasteners or when subjected to stress, such as occurs in the normal use of structural lumber.

DESCRIPTION OF THE PRIOR ART

A composite board panel having wood veneer or cardboard exterior surfaces cemented to fiberboard or boxboard intermediate layers and a wire mesh reinforcement is disclosed, for example, in U.S. Pat. No. 1,387,011.

A building plate composed of exterior veneer sheets and a core of bonded wood sawdust is disclosed in U.S. Pat. No. 2,356,625.

The two exterior veneer sheets of these patents are disposed with the grains of the veneer sheets extending in the same direction. Longitudinally spaced veneer strips are adhesively bonded directly to the inside faces of the veneer sheets, with the grain of the strips substantially perpendicular to the grain of the veneer sheets. All the veneer strips restrain lateral expansion somewhat and reduce accompanying warping and buckling of the panel as moisture is absorbed from the air. Such plates have not been accepted to any great extent commercially because, inter alia, the product is not a completely balanced product. In one embodiment of the disclosed plate, the plate has, in addition to the two surface veneer sheets, a centralized third veneer sheet having its grain parallel to the grains of the surface sheet.

The composite wood panel disclosed in U.S. Pat. No. 3,616,128 has a wood particleboard core and face and back veneer plies adhesively bonded thereto. The grain of one of the surface veneers is perpendicular to the grain of the other facing veneer sheet to provide dimensional stability, but the panel is not sufficiently dimensionally stable for many purposes.

Other prior art attempts to produce a laminated wood panel can be found in U.S. Pat. Nos. 2,744,044; 4,086,382; and 4,364,984. U.S. Pat. No. 2,744,044 employes a novel, thermoset polyester or alkyd resin which is used as a binder for a layer of glass fibers, which are in turn bonded to a layer of veneer. Such a panel is not suitable as a substitute for structural lumber due to the relatively high cost of the binder and glass fibers. U.S. Pat. No. 4,086,382 produced a composite wood panel wherein layers of veneer are glued together with a finer resistant glue or cement. Although the glue or cement may contain a filler, there is no disclosure of a laminate comprising a veneer face layer bonded to a mixture of wood chips and binder. U.S. Pat. No. 4,364,984 does disclose a laminate comprised of wood particles bonded together by an adhesive to form a multilayer wood particleboard. In one embodiment, the board has a central core of three layers of wood strands sandwiched between two outer surface-forming layers of fine wood particles. This core portion can be laminated to facing and backing veneers. However, the panel produced lacks the structural strength and dimensional stability for many purposes.

OBJECTS OF THE INVENTION

It is an object of the present invention to provide a panel and laminated veneer lumber having face and back veneer sheets and a mat of adhesively-bonded biomass particles, such as lignocellulose particles, as a core, which panel and lumber has improved dimensional stability and can be made on conventional apparatus at a commercially acceptable production rate.

Another object of the invention is to provide a balanced laminated wood panel and lumber having wood veneer surface plies and a core of lignocellulose particles adhesively-bonded into a mat, and adhesively-bonded face-to-face to the veneer plies.

A still further object of the present invention is to provide a process for making a dimensionally stable laminated wood panel and lumber having a core formed of adhesively-bonded lignocellulose or similar biomass particles.

Other objects will become apparent from the following description with reference to the accompanying drawings.

DETAILED DESCRIPTION OF THE INVENTION

The foregoing objects and others are accomplished in accordance with this invention by providing a composite wood panel and laminated veneer lumber ripped or sawn therefrom, having improved dimensional stability under various conditions of humidity in the ambient air about the panel and absorption of moisture by the panel.

The panel disclosed in my aforementioned U.S. patent applications comprised exposed wood veneer sheets and a core comprising a mat of lignocellulose or similar biomass particles adhesively-bonded together and bonded to the face and back wood veneer sheets, and an intermediate veneer sheet essentially disposed between the face and back veneer sheets, which separates the core into two substantially equal thicknesses. The grain of the intermediate veneer sheet being disposed substantially parallel to the face and back wood veneer sheets, but having the grain oriented perpendicular to the two exposed veneer sheets.

Such a panel can be fabricated on existing equipment used for making plywood and/or particleboards at a production rate which is acceptable in commercial production.

In one embodiment of the process disclosed in my aforementioned patent application, a first veneer sheet is placed on a caul plate, a layer of wood particles (in the form of sawdust, chips, strands or flakes, will hereinafter be referred to collectively as strands) mixed with a suitable resinous adhesive is disposed on the veneer sheet on the caul plate, a second wood veneer sheet is disposed on the blend of wood particles and adhesive, the second layer of a blend of wood particles and adhesive is spread over the second veneer sheet, and then a third veneer sheet is placed on the second layer of wood particles. The resulting composite is heated and pressed between platens of a conventional press used in making particleboard, hardboard and the like, to activate the adhesive, bond the particles together, and bond the resulting particle layer or mat to the faces of the adjacent veneer sheets and thereby form a substantially rigid panel adapted to be used as a structural member in the construction of a building or the like. Although the resulting panel may be ripped or sawed into smaller dimensions, the pieces thus obtained are not of suitable dimensions so as to be substituted for conventional structural lumber.

A composite laminated veneer lumber of the present invention is obtained by the formation of an indefinite or continuous length multi-ply panel, which is then ripped into dimensions suitable as a substitute for conventional structural lumber.

Figure 1:
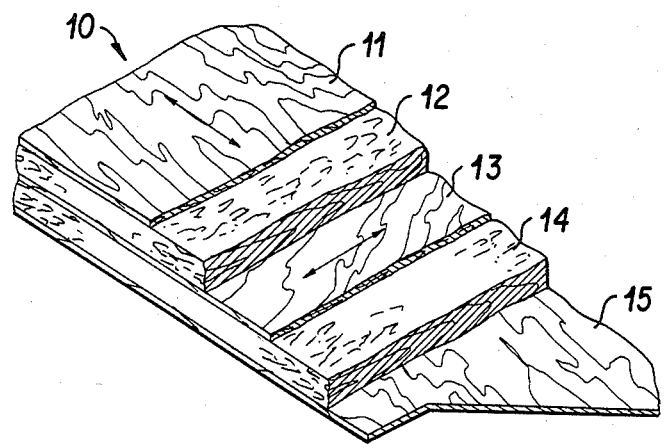
FIG. 1 is a perspective view of a panel produced according to my previous application.

In my previous applications, I disclosed a wood panel 10, as shown in FIG. 1, which has an exposed face veneer sheet 11, such as of Douglas fir, adhesively-bonded with phenolformaldehyde resin to a mat containing wood particles 12 bonded to each other with the same resin. The mat 12 is bonded on its opposite face to a second veneer sheet 13, also of Douglas fir. Veneer sheet 13 is bonded on its opposite face to a second mat of bonded wood particles 14, which in turn has its opposite face bonded to a second exposed Douglas fir veneer sheet 15. The structural panel of the present invention is the precursor of the dimensional lumber which can be utilized as a substitute for standard structural lumber, and is similarly composed of layers of veneer and wood strands.

Figure 2:
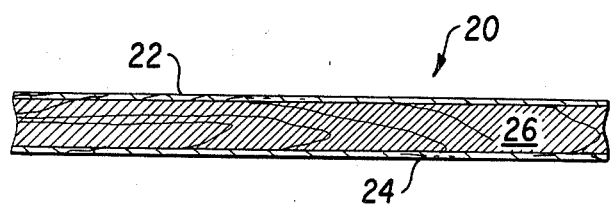
FIG. 2 is a side view of a first type of precursor panel.

With reference to FIG. 2, it can be seen that a precursor panel (hereinafter termed "type A Panel") 20 is comprised of an upper veneer 22 and a lower veneer 24, with the orientation of the grains of veneers 22 and 24 parallel. Between veneers 22 and 24 is a mixture of adhesively-bonded biomass particles exemplified by wood strands 26 oriented parallel to the grains of the upper and lower veneer layers. To facilitate the description of the invention wood strands are used throughout the specification as an exemplification of biomass particles. The alignment of the wood strands in an orientation parallel to that of the veneer grain can be accomplished through the use of electrostatic discharge or by mechanical means, i.e., by passing the particles through a rake or comb. The wood strands in layer 26 are mixed with a binder, such as any of the resins utilized in the production of the panels disclosed in my previous applications. The lower veneer sheet 24 is placed upon a caul, with the oriented wood strands then placed next and, upon assembly of upper veneer sheet 22, the mat thus formed is pressed to produce an oriented strandboard or flakeboard, which is then transferred to a lay-up station, which will be further described hereinbelow.

Figure 3:
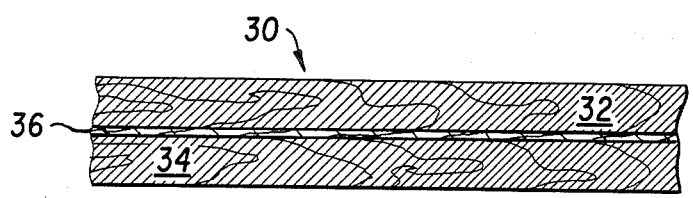
FIG. 3 is a side view of a second type of precursor panel.

FIG. 3 illustrates a second precursor panel (hereinafter termed a "type B panel") 30 comprised of an uppermost layer of oriented wood strands 32 and a lower layer of oriented wood strands 34. The orientation of the wood strands in layer 32 and layer 34 are parallel. Further, the binder utilized in each of layers 32 and 34 may be any of the same resins previously discussed. A veneer sheet 36 lies in a plane parallel to those of each of layers 32 and 34, but with the grain of the veneer sheet running transverse to the orientation of the wood strands in each of layers 32 and 34.

FIGS. 2 and 3 are not drawn to scale, since the dimensions of each of the type A panels 20 and the type B panels 30 may vary, depending on the particular use and properties desired in the finished product.

The type A panels 20 are typically a three-ply panel and can be of any size, but generally will be manufactured in 4 foot by 8 foot sheets or larger, or on a continuous basis. Generally, the panels will be about ½ inch in thickness, with about 1/10th of an inch or thicker veneer in each of layers 22 and 24. Dimensions of a 4 foot by 8 foot sheet is preferred, since conventional existing processes may be utilized.

The type B panels 30 will be approximately ½ inch to 1½ inches in thickness but, as stated heretofore, each of panels 20 and 30 may vary in thickness. Type B panels 30 will consist of a cross-band of veneer 36, generally placed in the center, although such placement is not critical. The presence of holes or defects in veneer 36 is not detrimental to the utilization of such heretofore discarded veneers, since the wood particles of layers 32 and 34 will form a mechanical bond by extending into or through the holes or interstices of veneer 36. The type B panels 30, illustrated in FIG. 3, may be made in the same manner as the type A panels, except that the layer of oriented wood strands 34 are laid upon the caul first and the veneer 36 and layer 32 laid up before pressing of the panel.

Figure 4:
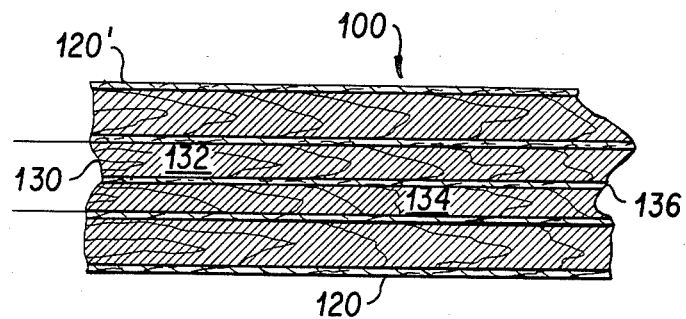
FIG. 4 is a side view of a complete panel according to the invention, which is a laminate of a combination of precursor panels shown in FIGS. 2 and 3.
Figure 5:
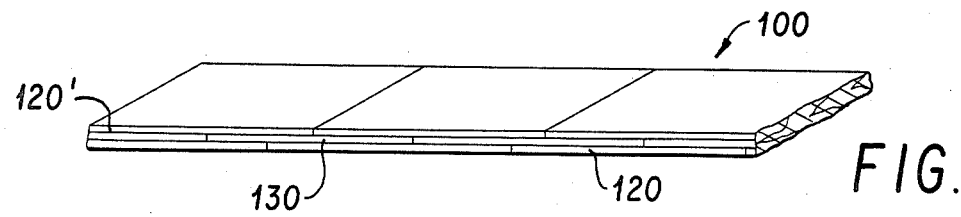
FIG. 5 is a perspective view of a series of precursor panels assembled with their end portions in a staggered array.

The production of the composite panel 100 of the present invention, as illustrated in FIG. 4, can best be understood by the process employed to manufacture the same. A first "type A" panel 120 is laid upon an endless belt or caul, and a "type B" panel 130 is placed on top of panel 120 with adhesive applied between them. A further "type A" panel 120' is laid upon the type B panel, again with an intervening layer of adhesive between surfaces of the "type A" and "type B" panels. In order to facilitate the continuous manufacturing process on the endless caul, the staggering of the end portions of each of panels 120, 130, and 120', so as to not coincide in a vertical direction, will greatly enhance the strength of the finished product. Staggering of the ends of each of the precursor panels is illustrated in FIG. 5. As can be appreciated, veneer 136 has its grain oriented transverse of the oriented wood strands in each of layers 132 and 134 of the type B panel 130. This veneer crossband 136 used in the type B panel 130 restrains expansion crosswise, and will prevent the panel from splitting when nailed in place or otherwise stressed, which often occurs when using fasteners, such as nails, in the prior art products.

Although applicant has described a composite panel 100 in FIG. 4 as having exposed face veneers 120 120', in a further embodiment of the invention there is formed a composite panel having exposed surfaces of oriented elongated strands of wood particles. In this embodiment the inner and/or outer veneers 22, 24 on each side of the type A panel may be omitted in the production of the type A panel. When laminated to type B panel of the panel composite the central veneer 136 is oriented with its grain transverse to the orientation of the strands in the exposed faces of the panel. It has been found that this composite panel has adequate strength for certain applications.

Moreover, the present applicant has found that the production of both the type A panel 120 and type B panel 130 in a conventional press, typically used to produce 4 foot by 8 foot panels, may be employed with only the production of the composite panel 100 requiring the utilization of an endless caul in a continuing pressing operation. Typically, the type A and type B panels can be produced in a hot press at a temperature of about 300° to 350° F. or higher at a pressure of about 300 to about 450 pounds per square inch or higher. Suitable adhesives or binders for both the wood strands, as well as binding the type A to the type B panel, can be formed from about 5 to about 10 wt %, dry basis, of an aqueous emulsion containing phenylformaldahyde resin, ureaformaldahyde resin or melamineformaldahyde resin, or a binder which chemically reacts with cellulose, such as an organic polyisocyanate which can be mixed with the wood or other biomass particles before the particles are laid up or may be sprayed on the particles, as well as between the type A and type B panels. Of the various organic polyisocyanates available commercially, polymers of diphenylmethane diisocyanate, such as MONDUR MR available from the Mobay Chemical Co., Pittsburg, Pa., or PAPPI available from Upjohn Chemical Co., may be used.

In a preferred embodiment, laying up the type A and type B panels so as to form a composite panel 100 can be achieved by utilizing a relatively cool type B panel, to which resin is applied as by dipping, spraying, brushing or rolling to the upper and lower surfaces. Relatively warm or hot type A panels can then be assembled with the relatively cool, resin applied type B panel prior to introduction of the composite to the continuous press.

In an alternative embodiment, each of the type A panels may be relatively cool, and the resin may be applied, as previously described, to each of these relatively cool type A panels. A relatively hot type B panel can then be assembled between the resin coated type A panels, which are then pressed to form composite panel 100. By applying the resin to the cooler face of one or more of the panels, applicant has found that the resin application and subsequent bonding is facilitated. This can be appreciated when it is realized that the type A or type B panels coming from a press typically leave the press at a temparature above about 250° F. Typically, in a production process, the panels are hot-stacked and not allowed to cool before being laminated to the other panels. On a production line, the resins can be applied when both the type A as well as the type B panels are still relatively hot. In these or an alternative embodiment, where in the three precursor panels are at such an elevated temperature that a conventional continuous cold press could be employed, the latent heat in the panels is sufficient to activate the resins and bond together the type A and type B panels. The utilization of the latent heat in the panels is of significance, in that less energy is utilized to produce the finished panel 100. The present process not only utilizes existing equipment but also increases the efficiency thereof to produce a thicker panel having more uniform consistency of properties than heretofore achieved. A typical press cycle for loading, pressing, and unloading 1½ inch thick panels is about 18 minutes. Heat and pressure transfer between the heated platens of the press must reach the interior of the panel to activate the thermosetting binder and compress the particles. Due to the thickness of such panels the portions thereof adjacent to the platens are overcured while the interior thereof is undercured and insufficiently compressed. This condition, known as sponginess, leads to discard of the panel for insufficient strength to be utilized in construction. By contrast, the same loading, pressing, and unloading for an ½ inch panel takes about 4 minutes, or 12 minutes total for the production of three press-loads of ½ inch precursor panels. Thus the existing equipment achieves a third or more increase in productivity. Utilization of the latent heat of the precursor panels in the laminated step avoids the necessity of reheating the panels. In addition to staggering the ends of each of the type A and type B panels when assembling onto the endless or continuous caul, as previously described, the panels in each layer can be scarf-jointed or finger-jointed before being assembled to improve the joint and the structural performance of the composite panel 100.

The structural lumber of the present invention can be obtained from this panel 100 by ripping or sawing pieces of the desired dimension from the panel. The thickness and grades of the layers of veneer can be varied to meet the structural requirements, as previously described. The geometry of the strands, density and resin content can also be varied to change structural performance and to minimize production costs. The variations described above can include the utilization of more than one veneer on the face or back of the type A panels, and can include such conventional materials as Douglas fir or pine, oak, mahogany, walnut or other suitable wood. A paper, ornamental wood or plastic sheet may be substituted for the surface veneer sheet or may be adhesively bonded to the exposed surfaces of the wood veneer sheets. A core of wood strands, bagasses, or other lignocellulose materials can vary both the cost of the properties of the panel and lumber ripped therefrom. Although the type B panel will be approximately ½ inch or more in thickness, applicant has found that a thickness of 1½ inches has been found suitable for use for the production of certain types of structural lumber. Of course, the term "structural lumber" is well known to those having ordinary skill in the art, and includes not only standard sizes of dimension lumber, such as 2×4 inches; 4×4 inches; 2×6 inches; 6×6 inches; 2×8 inches; 2×10 inches, etc.; but also any other sizes of dimension lumber desired. Moreover, the lengths of the dimension lumber are not restricted and can be of any length, as they are cut from a continuously produced length of panel 100.

Although the invention has been described in detail for the purpose of illustration, it is to be understood that such detail is solely for that purpose and that variations can be made therein by those skilled in the art without departing from the spirit and scope of the invention, except as it may be limited by the claims.

I claim:

1. A laminated veneer lumber, comprising:
   spaced facing exposed panels, each of said panels comprising an exposed veneer sheet and a layer of adhesively-bonded biomass particles adhered to said exposed veneer sheet, of said panels disposed such that the grain in one exposed veneer sheet of one panel lies substantially parallel with the grain in the exposed veneer sheet of the other panel; and
   an intermediate panel comprising a layer of veneer sheeting sandwiched between layers of adhesively-bonded biomass particles disposed substantially parallel and coextensive with the exposed veneer sheets, with the grain of the layer of intermediate veneer sheeting being substantially perpendicular to the grains of the exposed veneer sheets said intermediate panel being bonded to each of said spaced facing panels by an adhesive layer.

2. The lumber of claim 1, wherein each one of said facing panels include at least one veneer sheet in addition to said exposed veneer sheet with said at least one veneer sheet being generally disposed substantially parallel with the exposed veneer sheet and oriented with its grain in the same direction as the grain of the exposed veneer sheet.

3. The lumber of claim 1, wherein the bonded biomass particles are lignocellulose particles.

4. The lumber of claim 1, wherein said particles are bonded together with a polymeric organic resin.

5. The lumber of claim 1, wherein said veneer sheet in said intermediate panel is bonded to the biomass on either side thereof with a different binder.

6. The lumber of claim 5, wherein one of the binders on said intermediate veneer sheet comprises a phenolformaldehyde resin.

7. The laminated veneer lumber of claim 1 wherein the layers of biomass particles in said intermediate panel are oriented substantially parallel to the grains in said exposed veneer sheet.

8. A laminated veneer lumber, comprising:
   spaced facing exposed panels, each of said panels comprising an exposed oriented layer of adhesively-bonded biomass particles, each of said panels disposed such that the grain in one exposed oriented layer of one panel lies substantially parallel with the grain in the exposed oriented layer of the other panel; and
   an intermediate panel comprising a layer of veneer sheeting sandwiched between layers of adhesively-bonded biomass particles disposed substantially parallel and coextensive with the exposed oriented layers with the grain of the intermediate veneer sheet being substantially perpendicular to the grains of the exposed oriented layers, said intermediate panel being bonded to each of said spaced facing panels by an adhesive layer.

9. A laminated veneer lumber, comprising:
   spaced facing exposed panels, each of said panels comprising an exposed veneer sheet and a layer of adhesively-bonded biomass particles adhered to said exposed veneer sheet, each of said panels disposed such that the grain in one exposed veneer sheet of one panel lies substantially parallel with the grain in the exposed veneer sheet of the other panel; and
   an intermediate panel comprising two oriented layers of adhesively-bonded biomass particles, said oriented layers snadwiching a layer of veneer sheeting between said oriented layers, with the grain of the sandwiched veneer being substantially perpendicular to the grains of the exposed veneer sheets.

* * * * *